Figure 4:
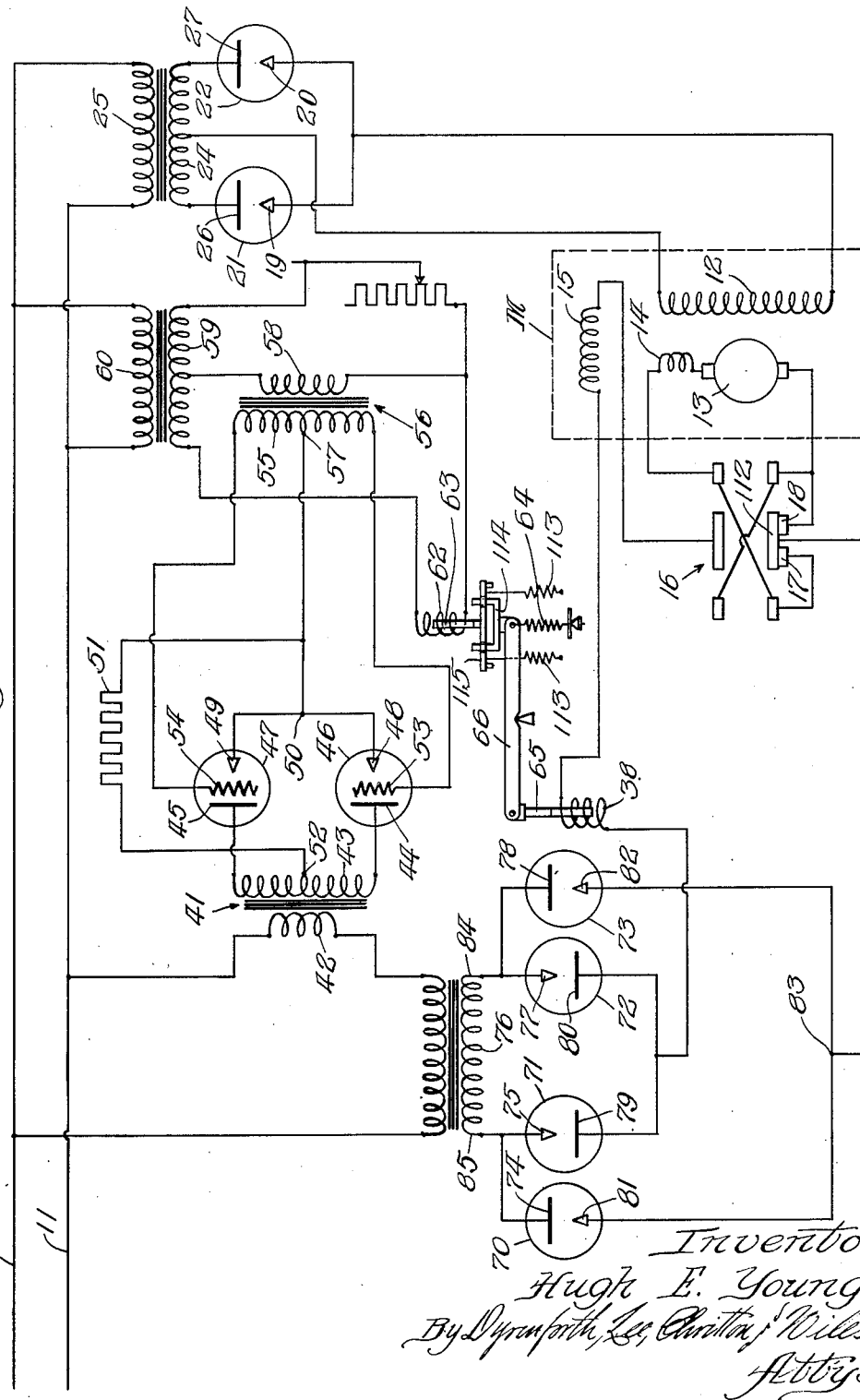

July 13, 1937.  H. E. YOUNG  2,086,594
MOTOR CONTROL APPARATUS
Filed June 11, 1934     4 Sheets-Sheet 1
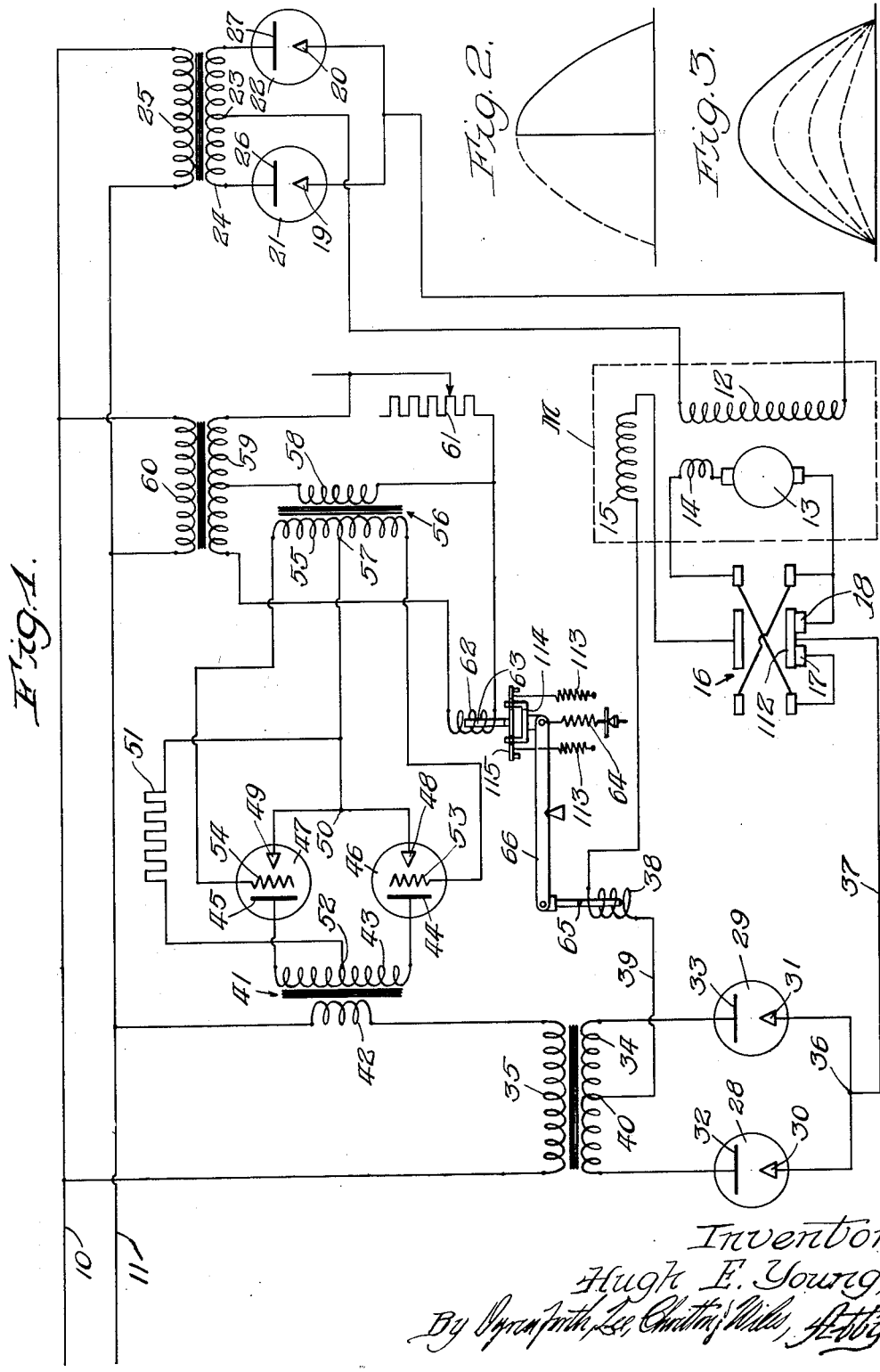
Inventor:
Hugh E. Young,
By Byrne, Smith, Lee, Cheatham Wiles, Attys.

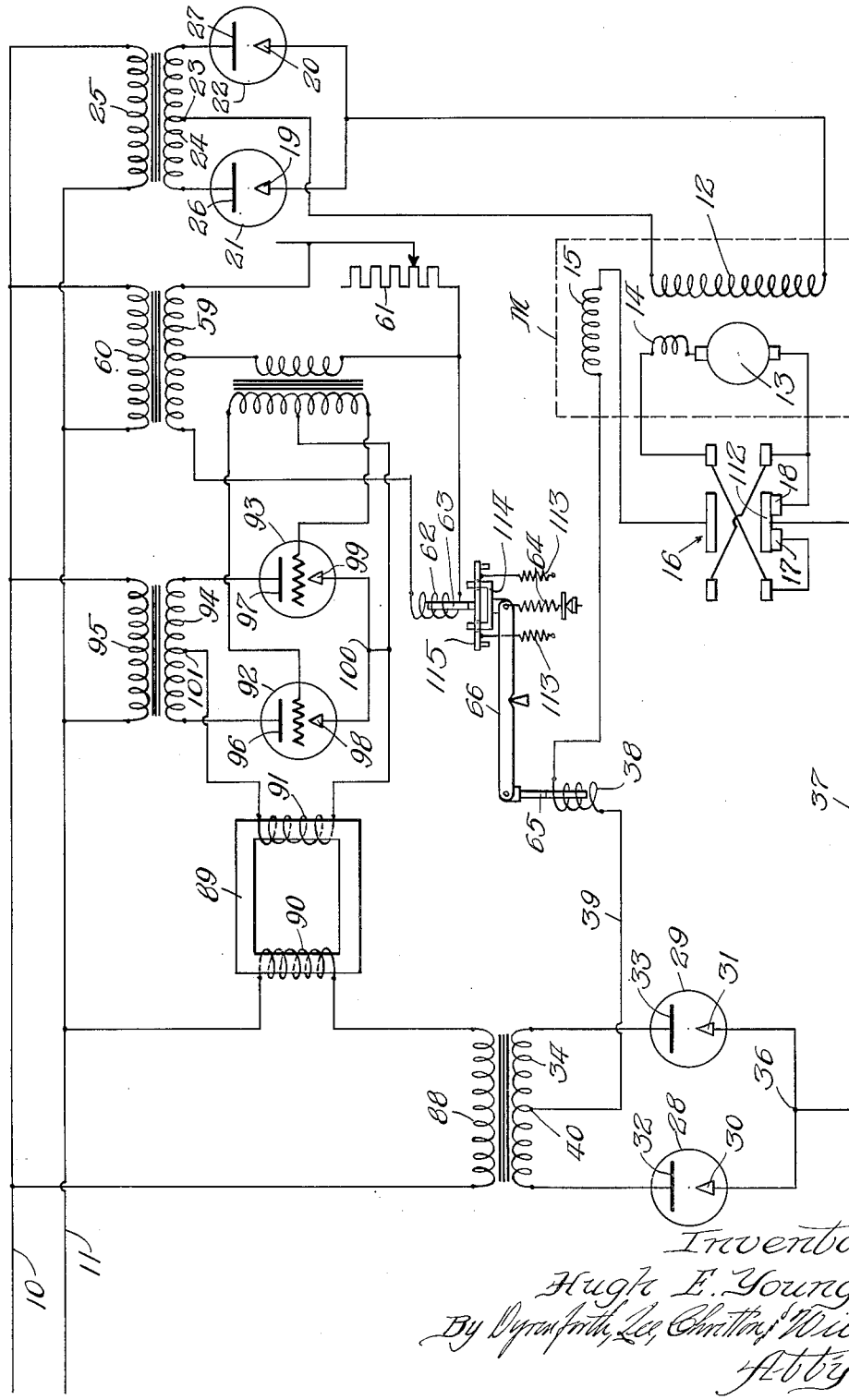

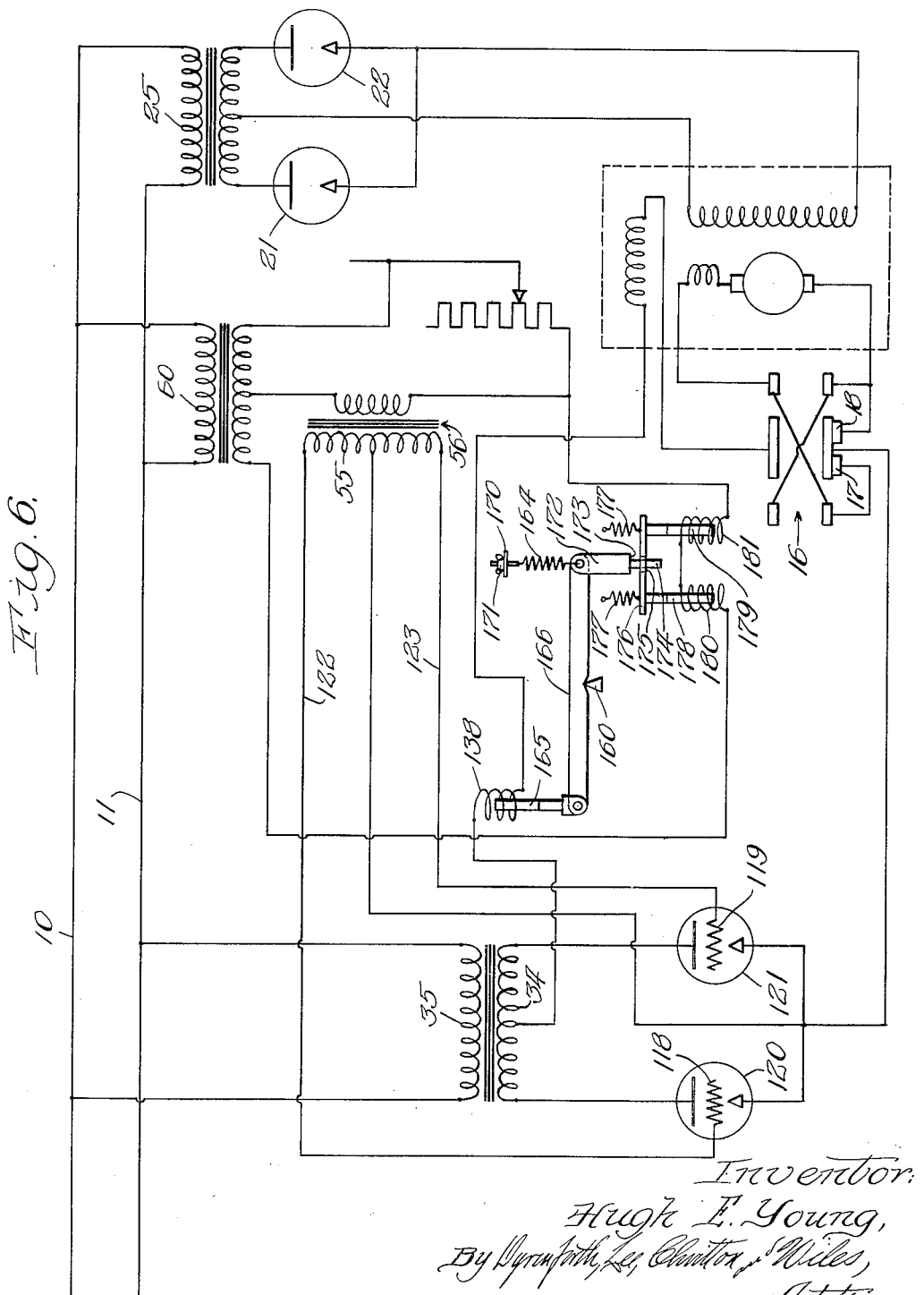

Patented July 13, 1937

2,086,594

UNITED STATES PATENT OFFICE 2,086,594

MOTOR CONTROL APPARATUS

Hugh E. Young, Chicago, Ill.

Application June 11, 1934, Serial No. 730,144

29 Claims. (Cl. 171—119)

This invention relates to motor control apparatus and more particularly to such apparatus designed to operate a direct current motor from current derived from an alternating current source.

This application is a continuation in part of my co-pending application on Motor control, filed March 15, 1933, and bearing Serial No. 660,955.

One feature of this invention is that it permits the operation of a direct current motor on a rectified alternating current with a high power factor; another feature of this invention is that it includes means for completely and automatically preventing any current surges or overloads through the motor; still another feature of this invention is that it provides convenient and effective manual control throughout a wide range of speed variation; another feature of this invention is that it provides a high starting torque; other features and advantages of this invention will be apparent from the following specification and the drawings, in which,—

Fig. 1 is a diagrammatic view of a circuit which employs bi-phase half wave rectification and which effects its control through an impedance transformer; Fig. 2 illustrates a wave form resulting when a controlled arc rectifying tube is operated on only one-half of a cycle; Fig. 3, illustrates the waves resulting from the operation of an arc rectifying tube throughout a complete cycle, but with different potential amplitudes; Fig. 4 illustrates a circuit employing bi-phase full wave rectification; Fig. 5 illustrates a circuit wherein control is achieved through a saturable core reactor; and Fig. 6, illustrates a circuit wherein control grids are used in the tubes feeding the armature.

Much difficulty has heretofore been experienced in operating direct current motors on rectified alternating current since the power factor and the starting torque have both been very low. Where controlled arc rectifying tubes were employed, the wave form of the current received by the motor when the tube was held to half of its full power is of the shape illustrated in Fig. 2. This results in a low power factor since there is current in phase with the voltage only during that portion of the cycle when the tube is in operation. Where tubes were operated during the complete cycle and the amplitude of the current controlled by external resistances the preferred wave forms shown in Fig. 3 were achieved but much power was wasted in I²R losses in the control resistances. In the case of simple shunt motors the starting torque was very poor because the pulsating direct current through the field was out of phase with that through the armature until the motor came up to speed.

This invention in one embodiment provides means for controlling the amplitude of the current supplied to the rectifying tubes with negligible losses in the control means and also achieves a high starting torque through the use of a compound wound direct current motor having its shunt field excited from a separate pair of rectifying tubes from those supplying the series field and armature. The use of the series field gives the motor a high starting torque while the separately excited shunt field provides stability when the motor has come up to speed. Inasmuch as the rectifying tubes supplying both the armature and series field, and those supplying the shunt field in this embodiment, operate during the complete portion of the cycle no wave form distortion is introduced to detrimentally affect the power factor of the line.

In the particular embodiment of this invention illustrated in Fig. 1, alternating current power is supplied by the lines 10 and 11. A compound wound direct current motor indicated in general by M, is employed having a shunt field 12, an armature 13, a commutator field 14, and a series field 15. A reversing switch 16 is provided whereby the direction of the current through the armature and commutator field may be reversed with relation to that through the series and the shunt fields. The reversing switch 16 preferably incorporates dynamic braking means including contacts 17 and 18 so placed that one of the switch blades 112 bridges them to short circuit the armature when the reversing switch is in its neutral position. The short circuit is never closed except when the switch is in neutral position, opening before the blades make contact in either of the operative positions.

One side of the shunt field 12 is connected to the cathodes 19 and 20 of two arc rectifying tubes 21 and 22. The other side of the shunt field is connected to the center tap 23 of the secondary 24 of a transformer having its primary 25 connected across the alternating current lines 10 and 11. The ends of the secondary 24 are connected, respectively, to the anodes 26 and 27.

The series field 15, commutator field 14, and armature 13 are supplied with pulsating direct current by another pair of arc rectifying tubes 28 and 29 having cathodes 30 and 31 and anodes 32 and 33. The anodes are connected to the ends of a secondary 34 of a second transformer having its primary 35 connected to the alternating current lines 10 and 11. The cathodes 30 and 31 are connected at the point 36 from whence the circuit is completed through a lead 37, the reversing switch 16, the armature 13, the commutator field 14, the series field 15, a solenoid coil 38, and a lead 39 to the center tap 40 of the secondary 34.

Control of the current flowing through the armature and series field is effected through an impedance transformer 41 having its primary 42 in circuit with the primary 35. The secondary 43 of the impedance transformer has its ends connected to the anodes 44 and 45 of grid controlled arc rectifying tubes 46 and 47. The cathodes 48 and 49 of these tubes are connected together at the point 50 and have a load circuit including the resistance 51 and running back to the center tap 52 of the secondary 43. The tubes 46 and 47 include control grids 53 and 54 which complete their grid return circuit through opposite ends of the secondary 55 of a grid control transformer 56 having its center tap 57 returned to the common point 50 of the cathodes 48 and 49.

The primary 58 of the transformer 56 forms the common return of two branches of a phase splitting circuit deriving its power from a secondary 59 of a transformer having its primary 60 connected across the alternating current lines 10 and 11. One branch of the phase splitting circuit contains a variable resistance 61 while the other branch contains a variable inductance 62 so arranged that its inductance is varied by changes in the position of an iron core 63. Springs 113 tend to draw the core 63 out of the coil 62 whereas the pull of the solenoid 38 on its solenoid core 65 operates through a lever 66 to counteract the action of the springs 113 after the flat bottom portion of the yoke 114 comes in contact with the bar 115. This lost-motion connection permits a certain current flow to pass uncontrolled, until such time as it becomes large enough to force the bottom of the yoke 114 into contact with the bar 115, whereupon the springs 113 supplement the pull of the spring 64. The phase splitting circuit is so arranged that at a given setting of the resistance 61 and the springs 64 an increase in current through the field coil and armature results in an increased pull on the solenoid 38 which forces the core 63 into the inductance 62 until the phase of the grids 53 and 54 has been shifted sufficiently with respect to the anodes 44 and 45 to reduce the current flow through the primary 42 and thus through the primary 35 to the desired value. A decrease in current through the solenoid 38 results in shifting the potentials applied to the grids more nearly into phase with those applied to the anodes and thus permits a larger current flow through the primary 35 to restore the armature and field current to the desired value. Manual control may be achieved by variation of the resistance 61, by alteration of the tension of the spring 64, or by movement of the lever 66. The phase shifting circuit with its constant current control is described in more detail in my copending application Serial No. 618,369.

In operating a motor from this circuit it is preferable to supply current to the shunt field before closing the circuit through the armature and series field since a much higher starting torque is obtained this way than if one switch completes both circuits at the same time. The reversing switch 16 may be of any common type which permits incorporating the dynamic braking contacts 17 and 18 in its neutral position as for example a rotatable reversing switch operated by a control crank. The dynamic braking contacts cooperate with the constant current control device and permit the motor to be reversed at full speed and under full load conditions, the dynamic brake operating to kill the rotation of the armature practically instantaneously, while the current limiting device comes into operation as the switch swings over into the reversing position and prevents a dangerous surge of current.

The impedance transformer 41 controls the current flow through the primary 35 with very little loss incident to such control. By giving the secondary 43 a 10:1 ratio with respect to the primary 42, for example a given current flow therein as determined by the tubes 46 and 47 will control a current flow through the primary 42 which is ten times as large as that in the secondary. The resistance 51 is made just high enough to prevent burning out of the secondary and overloading of the tubes when the tubes are passing current throughout the complete cycle, since the current is then limited only by the external resistance in the circuit. Intermediate control is secured by the grid action in the tubes, since tube control introduces no resistance losses.

In operation, the circuit illustrated in Fig. 1 achieves complete control of the magnitude of the current flow through the action of the impedance transformer 41. When all six tubes are in operation, the shunt field 12 is excited and the armature 13, commutator field 14 and series field 15 receive current which has a smooth wave form but the quantity of which is controlled through the impedance transformer, either by the action of the current limiting device or by manual manipulation of one of the elements of the phase splitting circuit. The motor has an excellent starting torque, since the armature current is in phase with that through the series field; it has good stability when it has come up to speed, since although the armature current has shifted somewhat in phase, it has shifted over more nearly into phase with the shunt field current; complete manual control from low speed to maximum is secured through the interaction of the grid-controlled tubes 46 and 47 and the impedance transformer 41; a good power factor is maintained, since the motor is operating on regular rather than distorted wave forms and since the armature current is always in phase with that through the series field and tends to shift into phase with that through the shunt field as the motor comes up to speed; and practically instantaneous reversing is possible through the action of the dynamic brake in killing the rotation of the armature, and the action of the constant current control device in preventing an excessive surge of current as the reversing switch is completely thrown over.

In the particular embodiment illustrated in Fig. 4, control is also effected through the action of a phase splitting circuit, a pair of grid-controlled arc rectifying tubes, and an impedance transformer in the main load supply circuit. In this embodiment, however, bi-phase full wave rectification is achieved by the use of four tubes 70, 71, 72, and 73. The tubes 70 and 71 have the anode 74 of one connected to the cathode 75 of the other and a common lead connected to one side of the secondary 76, which secondary carries the main load current. The tube 72 has its cathode 77 connected to the anode 78 of the tube 73 and a common lead then connects both to the other end of the secondary 76. The anodes 79 and 80 of the tubes 71 and 72 are connected together and from them a lead runs to the solenoid 38 and thence to the series field 15, reversing switch 16, commutator field 14 and armature 13 of the direct current motor. The return of this circuit is made to the cathodes 81 and 82 of the tubes 70 and 73, which are joined at the common point 83.

In this form of circuit, the current when travelling from the end 84 of the secondary 76 toward the end 85, passes through the tube 70, up through the armature and commutator field, back through the series field and solenoid, and then through the tube 72 is returned to the end 84 of the secondary to complete the circuit. When the alternating current is travelling from 85 toward 84, on the other hand, it passes through the tube 73, again up through the armature 13 and commutator coil 14, back through the series field 15 and solenoid 38, and is returned through the tube 71 to the end 85 of the secondary. In both cases, the other two tubes reject the current, since arc rectifying tubes do not pass current from cathode to anode when operating properly, but only from anode to cathode. All of the advantages achieved by the first circuit are retained in this circuit and, in addition, bi-phase full wave rectification permits more power to be drawn from the transformer carrying the main load current without any danger of overloading it.

In the embodiment illustrated in Fig. 5, control of the quantity of current flow through the primary 88 is effected through a saturable core reactor 89. This reactor has one coil 90 connected in series with the primary 88 and another coil 91 wound on the same core and supplied with direct current by a pair of grid-controlled arc rectifying tubes 92 and 93, deriving their power from the secondary 94 of a transformer having its primary 95 connected across the alternating current lines 10 and 11. In this form of the device, the tubes 92 and 93 have their anodes 96 and 97 connected to the ends of the secondary 94 and their cathodes 98 and 99 joined at the point 100 from which pulsating direct current is returned through the coil 91 to the center tap 101 of the secondary 94.

The saturable core reactor employed here serves to control the amount of current flowing through the coil 90 and, therefore, through the primary 88 without in any way disturbing its smooth wave form. This method is, therefore, equally effective with the impedance transformer in providing control without lowering the power factor by the introduction of wave form distortion.

In the form shown in Fig. 6 no impedance transformer or saturable core reactor in circuit with the primary 35 is used, but instead control is achieved through control means inserted directly in the tubes feeding the armature and series field, shown here as grids 118 and 119 in the controlled arc rectifying tubes 120 and 121. In this form the grid transformer 56 has one end of its secondary 55 connected to the grid 118 by the lead 122 and the other end connected to the grid 119 by the lead 123. The reversing switch 16 and the dynamic braking contacts 17 and 18 operate as discussed in connection with the embodiment illustrated in Fig. 1. This form of control somewhat decreases the power factor due to wave-form distortion, yet it retains all of the other advantages of the embodiment illustrated in Fig. 1.

The current limiting device illustrated in Fig. 6 is of a slightly different arrangement than that used in Figs. 1, 4, and 5. In this form the lever 166 is pivoted about a fulcrum 160. At one end thereof it has an iron core 165 adapted to move into or out of the solenoid 138, through which the armature and series field current of the motor passes. Resistance to the pull of the current in solenoid 138 is provided by the tension of a spring 164, which spring is fastened to a fixed member 170 by some adjustable means, as for example a wing nut 171. At this same end of the lever there is a member 172 having a shoulder 173 and a narrow portion 174. This narrow portion is slidably splined in an opening 175 in a bar 176 which is supported by springs 177. The bar 176 has at each end thereof iron cores 178 and 179 which are adapted for movement into or out of the coils 180 and 181, respectively. These two coils are connected in series and together form the inductance branch of the phase splitting circuit.

It may be seen that, as is also the case in the structure used in Figs. 1, 4, and 5, the lever 166 is free to move a certain amount before altering the position of the cores 178 and 179 in the coils 180 and 181. Thus provision is made for a certain amount of current changes through the solenoid 138 without any limiting effect, yet when the current rises above the desired value the shoulder 173 comes into contact with the bar 176, forces the cores further into the coils, and thus prevents too large a current. Through the use of a lost motion connection in connection with the current control means control of the motor through independent conventional control means may be used, if so desired, while retaining the advantages of a current limiting device to prevent overload currents from damaging the motor, and to completely prevent surges, as for example when the motor is reversed.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in the invention as broadly as permissible, in view of the prior art.

What I regard as new, and desire to secure by Letters Patent, is:

1. Apparatus of the character described comprising in combination a direct current motor having an armature circuit, a rectifying tube supplying the motor circuit with unidirectional current, an alternating current supply circuit for said tube, regulating means for controlling the current passed through said tube, said means comprising a winding in the supply circuit, a control circuit having a winding inductively related to the first winding, a regulator having a series coil in the motor circuit, and a movable magnetic member controlled by the coil, and means governed by movement of said magnetic member for gradually varying the current flow in said control circuit to regulate the flow of current through said tube.

2. Apparatus of the character described, including a direct current motor, an arc rectifying tube supplying said motor with direct current from an alternating current supply circuit, means whereby the flow of alternating current in said circuit is controlled, said means including a coil in said circuit coupled to a secondary circuit capable of variation, and regulating means in series relation with the motor circuit whereby the current through said direct current motor effects proportional variations in said secondary circuit in such manner that the accelerating and decelerating motor currents are maintained at the set desired average normal values, yet high instantaneous peak currents, without exceeding the average normal value, are available for accelerating and decelerating high instantaneous peak loads on the same adjustment.

3. Apparatus of the character described, including a direct current motor having a series field winding, an arc-rectifying tube supplying said motor with direct current from an alternating current supply circuit, an impedance device in said supply circuit, a secondary circuit coupled to said impedance device, and means controlled by the current through the motor for varying the current in said secondary circuit whereby the current supplied to said tube may be varied in such manner that the accelerating and decelerating motor currents are maintained at the set desired average normal values, yet high instantaneous peak currents, without exceeding the average normal value, are available for accelerating and decelerating high instantaneous peak loads on the same adjustment.

4. Apparatus of the character described, including a direct current motor having a series field winding, an arc rectifying tube supplying said motor with direct current from an alternating current supply circuit, an impedance device in said supply circuit, a secondary circuit coupled to said impedance device, a direct current solenoid in series with said series field winding, a phase-splitting circuit cooperating with said secondary circuit, and means whereby changes in current in said solenoid operates to change the electric circuit constants in said phase-splitting circuit which controls the arc rectifiers, which in turn control said impedance device in the supply circuit in such manner that the accelerating and decelerating motor currents are maintained at the set desired normal average values, yet high instantaneous peak currents, without exceeding the average normal value, are available for accelerating and decelerating high instantaneous peak loads on the same adjustment.

5. Apparatus of the character described, including; a direct current motor having an armature, series field winding, and second field winding; an arc-rectifying tube supplying said armature and series field winding; a second arc-rectifying tube supplying said second field winding; an alternating current supply circuit whereby power is derived by both tubes; an inductance coil in said alternating current supply circuit; a secondary circuit coupled to said coil; a controlled arc-rectifying tube in said secondary circuit; a phase-splitting circuit whereby said last-mentioned tube may be controlled; a direct current solenoid in series with said series field winding; and means whereby changes in current in said solenoid affect said phase-splitting circuit.

6. Apparatus of the character described, including a direct current motor, an arc rectifying tube supplying said motor with direct current from an alternating current supply circuit, an impedance transformer having its primary winding in said circuit, and means regulated by current through the motor for changing the current flow through the secondary of said transformer in such manner as to tend to prevent the motor current from exceeding a predetermined value as said motor speeds up, also to regulate the current in such manner that the accelerating and decelerating motor currents are maintained at the set desired average normal values, yet high instantaneous peak currents, without exceeding the average normal value, are available for accelerating and decelerating high instantaneous peak loads on the same adjustment.

7. Apparatus of the character described, including; a direct current motor having a series field winding, armature, and second field winding; an arc-rectifying tube supplying said series field winding and armature with current; a second arc-rectifying tube supplying said second field winding with direct current; an alternating current supply circuit for said tubes; an impedance transformer having its primary in said alternating current supply circuit; a control circuit including the secondary of said impedance transformer; a direct current solenoid in series with said series field winding; and means whereby changes in current in said solenoid effect current changes in said control circuit to maintain the current through said solenoid constant.

8. Apparatus of the character described, including; a direct current motor having a series field winding, armature, and second field winding; an arc-rectifying tube supplying said series field winding and armature with direct current; an arc-rectifying tube supplying said second field winding with direct current; an alternating current supply circuit for said tubes; a saturable core reactor having one coil in series with said alternating current supply circuit and another coil in a control circuit; a controlled arc-rectifying tube in said control circuit; a phase-splitting circuit; and means whereby changes in current flow in said series field winding effect changes in said phase-splitting circuit to control the current flow in said alternating current supply circuit, said means including a direct current solenoid in series with said series field winding.

9. Apparatus of the character described, including; a compound wound direct current motor, said motor having a series field winding, an armature, and a second field winding; an arc rectifying tube supplying a series field winding and armature of said motor with direct current; a second arc rectifying tube supplying the second field winding with current; an alternating current supply circuit energizing both tubes; control means in said first arc rectifying tube; a phase splitting circuit coupled to said control means; a solenoid in series with the armature of said motor, said solenoid having a movable core therein; and means whereby movement of said core effects a change in said phase splitting circuit to limit the current through said motor.

10. Apparatus of the character described, including: a direct current motor; an arc rectifying tube supplying said motor with current; an alternating current supply for said tube; a phase splitting circuit consisting of a resistance and variable reactance, said variable reactance having a movable core which by its relative position in the reactance coil produces a variable phase displacement of the grid voltage with regard to the anode voltage which in turn controls the firing of the rectifier; a solenoid in series with said motor, said solenoid having a plunger therein; and means connected to said plunger whereby changes in current in said solenoid effect variations in said phase splitting circuit, said means including a lost motion connection to permit the core of the phase split reactor to have a somewhat more limited motion than the motion of the solenoid plunger.

11. Apparatus of the character described, including: an alternating current supply; a controlled arc rectifying tube energized by said supply; a direct current load circuit fed by said tube; a solenoid in series with said load, said solenoid having a movable core therein; a pivoted lever having one end thereof connected to said movable core; a phase splitting circuit connected to control the flow of current from said alternating current supply; means whereby mechanical motion effects a change in said phase splitting circuit; and a lost motion connection through which the other end of said lever is connected to said last-named means.

12. In combination, an alternating current supply circuit, a direct current motor having an armature, a series field winding and a separately excited shunt field winding, a rectifier for supplying rectified current from said supply circuit to said armature and series field winding in series, a second rectifier for supplying rectifier current from said supply circuit to said shunt field winding, and regulating means for controlling the output of said first rectifier to said armature and series field winding whereby as the motor speeds up the difference in phase angle between the armature current and the shunt field winding current is reduced.

13. Method of operating a compound wound direct current motor having an armature winding and a series field winding connected in series, and a separate shunt field winding, which comprises impressing unidirectional impulses of potential at a given frequency upon the terminals of the armature and series field winding, impressing upon the shunt field winding unidirectional impulses of potential at the same given frequency, but out of phase with the impulses impressed on said armature and series field, and, as said armature accelerates, reducing the phase difference between said two sets of impulses.

14. In combination, a direct current motor having a first circuit comprising an armature and series type field winding connected in series, a second circuit comprising a shunt type field winding, a rectifier for supplying the series field winding and armature with rectified current, a rectifier for supplying the shunt field winding with rectified current, a source of alternating potential for supplying said rectifiers, the phases of rectified current through the first rectifier being different from that through the second rectifier when the motor is at standstill, means sensitive to the current flow through the series field winding and armature circuit for shifting the phase of the rectified current through one of said circuits toward the phase of the rectified current through the other of said circuits as said motor accelerates.

15. The combination of claim 14, wherein the first rectifier comprises a controlled arc rectifying tube having means for controlling the periods of conductivity thereof, and wherein said first means controls the time within each rectified wave during which said tube is conductive.

16. The combination of claim 14, wherein the said first rectifier is a grid controlled arc rectifying tube, and wherein said means comprises a solenoid in series with the first circuit, and a variable inductance operated by said solenoid for shifting the phase of excitation of the grid.

17. In combination, an alternating current supply circuit, a direct current motor comprising a first circuit having a series type field winding and armature in series, a second circuit comprising a shunt type field winding, a first rectifier comprising a controlled rectifier tube having a control electrode, means for synchronously exciting said electrode to determine the period during the wave that said tube is conductive, said tube being connected to said first circuit, a regulator sensitive to current flow in said first circuit for shifting the phase of excitation of said electrode, and a second rectifier for supplying rectified current to said second circuit, said rectifiers being supplied with alternating potential from said supply circuit.

18. The combination of claim 17, with a motor controller having a reversing switch having contacts for reversing the armature with respect to the series field and having a short circuiting contact adapted to be closed in intermediate position between the closure of the reversing contacts.

19. In a motor control circuit, a source of alternating potential, a motor having a series field winding and armature circuit and a separately excited field winding circuit, a rectifier between said source and said separately excited field winding circuit to supply said field winding with unidirectional impulses of current, a controlled rectifier between said source and the series field winding and armature circuit to supply unidirectional impulses of current, regulating means sensitive to the effective magnetic value of the unidirectional impulses of current flowing through the field winding and armature circuit and acting to shift the effective phase of the impulses of unidirectional current through the rectifier as the armature speeds up.

20. In a motor control system, a source of alternating current potential, a direct current motor having a separately excited field winding circuit, a rectifier excited from said source for supplying unidirectional current to said field winding circuit, said motor having an armature and series field winding circuit, a rectifier excited from said source for supplying unidirectional current to said series field winding and armature circuit, and regulating means sensitive to the effective unidirectional current flow in said field winding and armature circuit for automatically limiting the current flow through said latter rectifier and field winding and armature circuit to a predetermined value.

21. An electric control system comprising, in combination, a direct current motor having an armature and series and separately excited field windings, a first rectifier disposed to be connected to a source of alternating current for energizing said separately excited field winding, a second rectifier disposed to be connected to said source of alternating current, said armature and series field winding being connected in series circuit relation and for energization to said second rectifier whereby the peak current flowing in said armature and the peak flux of the field will be in phase coincidence to provide a high starting torque, and manually controllable phase shift means connected to control the amount of energy supplied to said armature and series field winding by said second rectifier and this manually controlled means so arranged that the control is at all times under full automatic supervision of the high peaked limiting control.

22. An electric control system comprising, in combination, a direct current motor having an armature and series and separately excited field windings, a first rectifier disposed to be connected to a source of alternating current for energizing said separately excited field winding, a second rectifier disposed to be connected to said source of alternating current, said armature and series field winding being connected in series circuit relation and for energization to said second rectifier whereby the peak current flowing in said armature and the peak flux of the field will be in phase coincidence to provide a high starting torque, phase shift means connected to control the amount of current supplied to said armature and series field winding by said second rectifier, and means disposed to be automatically responsive to the current supplied to said armature and series field winding for controlling the functioning of said phase shift means for maintaining the maximum accelerating and decelerating currents at the desired normal average value, yet for high instantaneous peak loads which may occur, having automatically available high instantaneous peak currents without exceeding the average normal value so that for the same adjustment the proper accelerating and decelerating time rates are maintained under all conditions.

23. An electric control system comprising, in combination, a direct current motor having an armature and series and separately excited field windings, a first rectifier disposed to be connected to a source of alternating current for energizing said separately excited field winding, a second rectifier disposed to be connected to said source of alternating current, said armature and series field winding being connected in series circuit relation and for energization to said second rectifier whereby the peak current flowing in said armature and the peak flux of the field will be in phase coincidence to provide a high starting torque, variable impedance means interposed between said second rectifier and said alternating current source, and phase shift means connected to control the impedance of said impedance means whereby the amount of energy supplied to said armature and series field winding is varied.

24. An electric control system comprising, in combination, a direct current motor having an armature and series and separately excited field windings, a first rectifier disposed to be connected to a source of alternating current for energizing said separately excited field winding, a second rectifier disposed to be connected to said source of alternating current, said armature and series field winding being connected in series circuit relation and for energization to said second rectifier whereby the peak current flowing in said armature and the peak flux of the field will be in phase coincidence to provide a high starting torque, variable impedance means interposed between said second rectifier and said alternating current source, phase shift means connected to control the impedance of said impedance means whereby the amount of energy supplied to said armature and series field winding is varied, and means disposed to be responsive to a variable characteristic of the energy supplied to said armature and series field winding for controlling the functioning of said phase shift means.

25. An electric control system comprising, in combination, a direct current motor having an armature and series and separately excited field windings, a first rectifier disposed to be connected to a source of alternating current for energizing said separately excited field winding, electric valve rectifying means disposed to be connected to said source of alternating current, said armature and series field winding being connected in series circuit relation and for energization to said electric valve rectifying means whereby the peak current flowing in said armature and the peak flux of the field will be in phase coincidence to provide a high starting torque, control electrode means in said rectifying means, and phase shift means connected to control the energization of said control electrode means whereby the amount of energy supplied to said armature and series field winding may be varied.

26. An electric control system comprising, in combination, a direct current motor having an armature and series and separately excited field windings, a first rectifier disposed to be connected to a source of alternating current for energizing said separately excited field winding, electric valve rectifying means disposed to be connected to said source of alternating current, said armature and series field winding being connected in series circuit relation and for energization to said electric valve rectifying means whereby the peak current flowing in said armature and the peak flux of the field will be in phase coincidence to provide a high starting torque, control electrode means in said rectifying means, phase shift means connected to control the energization of said control electrode means whereby the amount of energy supplied to said armature and series field winding may be varied, and means disposed to be responsive to a variable characteristic of the energy supplied to said armature and series field winding for controlling the functioning of said phase shift means.

27. In a motor control system, an alternating current supply circuit, a controlled arc rectifier for supplying direct current to the armature, commutating and series motor fields, said rectifier being controlled by a direct current solenoid in series with the load circuit, said solenoid operating a mechanical means which in turn controls a phase split circuit whereby the arc rectifier is controlled in such a manner that the accelerating and decelerating motor currents are maintained at the desired average normal values, said apparatus permitting heavy instantaneous peak torques without exceeding the average normal value, said apparatus being of such character that the time duration of the peak can be set to any desired value, means causing current when it has risen to its established limiting value to be held constant at such value and constant under all conditions where it would exceed such limiting value if not controlled by said means, and having the circuit connection so arranged that the impressed voltage to the anodes of the rectifiers is varied by the superimposed counter electro-motive force in a manner so as to decrease the anode voltage with an increase of the counter electro-motive force and thereby effect control of the arc current, a second rectifier feeding the shunt motor fields and having its supply from the same source of supply which feeds the anode transformer of the armature circuit and connected in such a manner that no disturbance of the phase relations relative to the anode transformer of the armature circuit to that of the shunt field circuit may be manifested and having the circuit constants of the series and shunt motor fields of such value that the instantaneous value of the rippled armature currents are in space phase with the instantaneous value of the ripple field flux from standstill to all speeds in order to realize the maximum torque possible at all times, a speed control introduced in the phase split circuit of the armature feed rectifier, said speed control brought about by manually or automatically varying the relative impedances in the phase split circuit, said speed control being so arranged and introduced in the phase split circuit that its control is at all times under full supervision and control of the automatic high torque acceleration, deceleration and current limiting control.

28. In a motor control system, an alternating current supply circuit, a controlled arc rectifier for controlling the primary current supplying the anode transformer of the armature circuit through an impedance transformer supplying direct current to the armature, commutating and series motor fields, said rectifier being controlled by a direct current solenoid in series with the load circuit, said solenoid operating a mechanical means which in turn controls a phase split circuit whereby the arc rectifier is controlled in such a manner that the accelerating and decelerating motor currents are maintained at the desired normal values said apparatus permitting heavy instantaneous peak torques without exceeding the average normal value, said apparatus being of such character that the time duration of the peak can be set to any desired value, means causing current when it has risen to its established limiting value to be held constant at such value and constant under all conditions where it would exceed such limiting value if not controlled by said means, and having the circuit connection so arranged that the impressed voltage to the anodes of the rectifiers is varied by the superimposed counter electro-motive force in a manner so as to decrease the anode voltage with an increase of the counter electro-motive force and thereby effect control of the arc current, a second rectifier feeding the shunt motor fields and having its supply from the same source of supply which feeds the anode transformer of the armature circuit and connected in such a manner that no disturbance of the phase relations relative to the anode transformer of the armature circuit to that of the shunt field circuit may be manifested, and having the circuit constants of the series and shunt motor fields of such a value that the instantaneous value of the ripple armature currents are in space phase with the instantaneous value of the ripple field flux from standstill to all speeds in order to realize the maximum torque possible at all times, a speed control introduced in the phase split circuit of the armature feed rectifier, said speed control brought about by manually or automatically varying the relative impedances in the phase split circuit, thus controlling the current in the armature circuit, said speed control being so arranged and introduced in the phase split circuit that its control is at all times under full supervision of the automatic high torque acceleration, deceleration and current limiting control.

29. In a motor control system, an alternating current supply circuit, a controlled arc rectifier for controlling the primary current supplying the anode transformer of the armature circuit through a saturable core reactor supplying direct current to the armature, commutating and series motor fields, said rectifier being controlled by a direct current solenoid in series with the load circuit, said solenoid operating a mechanical means which in turn controls a phase split circuit whereby the arc rectifier is controlled in such a manner that the accelerating and decelerating motor currents are maintained at the desired normal values, said apparatus permitting heavy instantaneous peak torques without exceeding the average normal value, said apparatus being of such character that the time duration of the peak can be set to any desired value, means causing current when it has risen to its established limiting value to be held constant at such value and constant under all conditions where it would exceed such limiting value if not controlled by said means, and having the circuit connection so arranged that the impressed voltage to the anodes of the rectifiers is varied by the superimposed counter electro-motive force in a manner so as to decrease the anode voltage with an increase of the counter electro-motive force and thereby effect control of the arc current, a second rectifier feeding the shunt motor fields and having its supply from the same source of supply which feeds the anode transformer of the armature circuit and connected in such a manner that no disturbance of the phase relations relative to the anode transformer of the armature circuit to that of the shunt field circuit may be manifested and having the circuit constants of the series and shunt motor fields of such a value that the instantaneous value of the ripple armature currents are in space phase with the instantaneous value of the ripple field flux from standstill to all speeds in order to realize the maximum torque possible at all times, a speed control introduced in the phase split circuit of the armature feed rectifier, said speed control brought about by manually or automatically varying the relative impedances in the phase split circuit, said speed control being so arranged and introduced in the phase split circuit that its control is at all times under full supervision and control of the automatic high torque acceleration, deceleration and current limiting control.

HUGH E. YOUNG.